United States Patent [19]
Nakanishi

[11] 4,286,666
[45] Sep. 1, 1981

[54] HORSESHOES

[75] Inventor: Kisaku Nakanishi, Tokyo, Japan

[73] Assignee: Shin Gijutsu Kigyo Kabushiki Kaisha, Yokohama, Japan

[21] Appl. No.: 87,000

[22] Filed: Oct. 22, 1979

[30] Foreign Application Priority Data

Oct. 27, 1978 [JP] Japan .................. 53-147097

[51] Int. Cl.³ .................................. A01L 5/00
[52] U.S. Cl. .......................... 168/4; 168/12; 168/24
[58] Field of Search .............. 168/12, 13, 17, 24, 168/DIG. 1, 4, 28, 29

[56] References Cited

U.S. PATENT DOCUMENTS

| | | | |
|---|---|---|---|
| 3,050,133 | 8/1962 | Ketner | 168/4 |
| 3,302,723 | 2/1967 | Renkenberger et al. | 168/4 |
| 3,494,422 | 2/1970 | Clark | 168/4 |
| 3,747,684 | 7/1973 | Wallen | 168/4 |

Primary Examiner—Hugh R. Chamblee
Attorney, Agent, or Firm—Koda and Androlia

[57] ABSTRACT

This invention relates to horseshoes that are adapted to fit snugly against the bottom of the hoof surface of a horse, which are made of an elastomeric material, such as a synthetic rubber, natural rubber, etc., and have a plurality of discrete or continuous recesses of an elongated shaped designed to accommodate nails on the surface facing the ground. Such elongated recesses may also be used to receive a metal plate or sheet on the bottom thereof, and a desired number of openings may be provided on the metal plate. Also the horseshoes may be formed with a plurality of projections extending upwardly from and around the opposite surface to the surface facing the ground for registering and positioning the horseshoes with respect to the bottom surface of the hoof. The extent of elasticity of the elastomeric material for the horseshoes may be selected at option from a range in terms of JIS A 45 to 98.

13 Claims, 5 Drawing Figures

HORSESHOES

BACKGROUND OF THE INVENTION

1. Field of the Invention

The present invention relates in general to horseshoes, and more particularly to horseshoes made of an elastomeric material such as a synthetic rubber, natural rubber, etc., which have a plurality of discrete or continuous recesses of an elongated shape designed to accomodate nails on a surface facing the ground thereof.

2. Prior Art

It has long been a common practice to apply horseshoes made of metal to the hoofs of a horse in order to protect them from cracking and accidental injuries. The conventional method of putting such metal horseshoes on the hoofs of a horse is that one of the horseshoes is registered or positioned correctly upon the bottom surface of a hoof and is then fixed against the bottom of the hoof by driving nails into the hoof from the bottom surface of the tread or the surface facing the ground of the horseshoe in such a manner that the nails may penetrate through the hoof in a slightly outwardly slanted fashion with their end tips exposed slightly out of the side surface of the hoof, and thereafter having the exposed end tips of the nails bent so as to prevent the nails and hence the horseshoe from deviating from the desired position and thus locking it into the desired position. However, when using such a conventional method of fixing the horseshoes on the hoofs of a horse, it would naturally be essential to renail the horseshoes each time they are replaced, thus resulting in many nail holes being left in the hoofs. This eventually leads to no room being left for renailing into the hoof.

Particularly, in the case of the race horse, it is common that a horseshoe of a relatively wide type, generally call "flat shoes", are normally put on and are set on the hoof by use of nails while they are red hot. At the time of the horse race, however, it is necessary to replace those flat shoes with ones having a relatively narrow width and which are made of a light alloy, which are generally called "race shoes". Consequently, it is generally inevitable that the cycle of replacing horseshoes on a race horse is far more frequent than in comparison to that of normal farm horses or the like.

In this respect, it is natural for the race horses which often take part in races, to accumulate many lock nail holes in their hoofs in a relatively short period of time, so that it would be difficult to put the horseshoes on. With the hoofs being in such a condition, there would be a high possibility of dropping a horseshoe or cracking a hoof or hoofs during a race. Should a horseshoe be dropped during a race, it would be very possible that the race horse would not only get its hoof injured, but also may even break that leg. As is generally known, once a race horse breaks its leg, on many occasions, there is no better choice other than a mercy killing. The dropping of a horseshoe during a race does not only bring the possibility of shortening the life of the race horse but often also causes the jockey to fall from the horse, and this occasionally results in his injury or even death.

More particularly, the conventional horseshoes made of metal are usually relatively heavy in weight, and thus create an undesired effect of substantial impacts or shock loads upon the leg joints of a horse while going on foot. In this respect, it would be harmful and dangerous for the horses wearing such conventional metal horseshoes to gallop or walk on relatively hard ground. Such risks would still exist even in the case of relatively soft ground.

Therefore, it has long been desired to have the conventional metal horseshoes improved thereby eliminating such drawbacks inherent thereto. The present invention is essentially directed toward the improvement of the metal horseshoes to meet the above-mentioned requirements.

SUMMARY OF THE INVENTION

It is therefore a primary object of the present invention to provide improved horseshoes which fully eliminate the drawbacks inherent to the conventional metal horseshoes as stated hereinbefore.

It is another object of this invention to provide improved horseshoes which can efficiently minimize the necessity to form so many renailed holes in the hoofs of a horse as in the conventional metal horseshoes.

It is still another object of this invention to provide improved horseshoes which protect the horse's legs from the risk of getting injured during galloping, cantering, trotting and walking.

It is still a further object of this invention to provide improved horseshoes which can easily be put on.

In summary, the horseshoes according to this invention are essentially characterized in that they are made of an elastomeric material and feature recesses for accommodating locking or erection nails therein on the surface facing the ground.

The present invention provides improved horseshoes, by way of the preferred embodiments, which can provide the following advantageous features. The surface of the horseshoes and hoofs of a horse have an adhesive applied to them, first upon the surface of the horseshoe to face the hoof thereof and then to the bottom surface of the hoof, before the two are bonded together, respectively. The horseshoes and the hoofs thus bonded are now correctly registered and positioned and thus they are secured by driving one to four nails from the horseshoes into the hoof of the horse. In this instance, the nail or nails are set within a recess or recesses formed in each of the horseshoes. After the adhesive sets, the nail or nails may or may not be removed. Since the nail or nails are driven particularly for the purpose of temporarily securing the horseshoes against the hoof of the horse until the adhesive sets sufficiently, it is not necessary to use as many nails to secure the horseshoes. Therefore, there is no necessity to drive the nails through the hoof and to further drive the end tips of such nails so that they are exposed out of the hoof's side surface and bent so as to secure the nails in due position from getting loose during use as with the conventional horseshoes. For this reason, a relatively short and thin nail will do for such purposes. Furthermore, by using an adhesive or bond in securing the horseshoes to the bottom surface of the hoof together with the use of erection nails, which may or may not be removed after the adhesive sets, there is also provided a unique advantage; the hoof of the horse does not hurt any more than necessary in comparison with the use of conventional metal horseshoes.

In addition, the horseshoes according to the present invention are made of an elastomeric material not like in the conventional horseshoes which are made of metal, and they are relatively light in weight, therefore assuring an easy and comfortable fit when galloping or walking thereon.

Also because the elastomeric material is characteristically elastic, the horseshoes according to this invention, are extraneous yet extraordinarily effective in precluding accidental risks of damage or even fracture of the horse's leg joint or joints during a race.

The above-mentioned object of this invention as well as further advantages, features and principles thereof will become more clear when reading the following detailed description of this invention by way of the preferred embodiments thereof in conjunction with the accompanying drawings, in which like parts are designated with like reference numerals.

DETAILED DESCRIPTION OF THE INVENTION

A description will now be given of a preferred embodiment of the present invention which reduces to practice the advangaeous features of this invention as stated hereinbefore.

Figure 1:
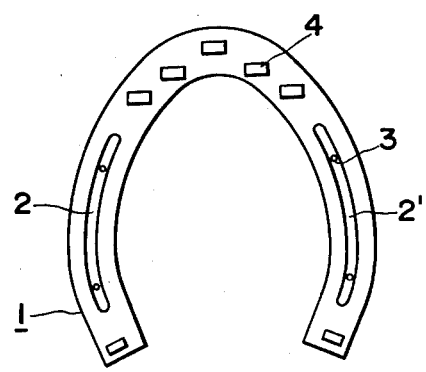
FIG. 1 is a front elevational view showing the general configuration of a preferred embodiment of a horseshoe according to this invention as seen from the surface facing the ground when worn by a horse.

As is shown in FIG. 1, a complete horseshoe 1 made of an elastomeric material according to this invention is provided (by way of example), with a pair of elongated recesses 2 and 2' adapted to accommodate the heads of a desired number of nails to be driven through a corresponding number of holes 3, which may be formed preliminarily in desired positions along the elongated recesses 2 and 2'. In this typical embodiment, these elongated recesses 2 and 2' are provided in discrete pairs with a generally common curvature or curve to the edge or peripheral curve of the complete horseshoe 1 on each wing thereof and on the surface of the complete horseshoe 1 facing the ground when it is fixed in use against the bottom surface of a hoof of a horse. However, these recesses are not necessarily made in pairs on each wing of the complete horseshoe 1, but may alternatively be formed along all the curved extensions of the complete horseshoe 1. Or a single continuous recess may be formed if it is taken into consideration that the purpose of the recess is essentially to temporarily secure the complete horseshoe 1 in position until the adhesive has completely bonded to the bottom of the hoof. Since the complete horseshoe 1 is made of an elastomeric material, these nail holes are not required to be formed preliminarily in the complete horseshoe 1.

According to this particular embodiment, as typically shown in FIG. 1, there are a plurality of projections 4 on the surface of the horseshoe facing the ground for the purpose of attaining an added affect of adhesion to the ground for a horse to walk on. However, it is apparent that these projections are not an essential element of the present invention.

For the complete horseshoe 1 according to this invention, a variety of elastomeric materials may optionally be used as a synthetic resin like a synthetic rubber or as a natural resin like natural rubber. The synthetic rubber may, for instance, be an urethane-series rubbers like polyurethane and/or a polyvinyl-series rubbers like a synthetic polybutadiene rubber and a synthetic polystylene rubber.

Figure 2:
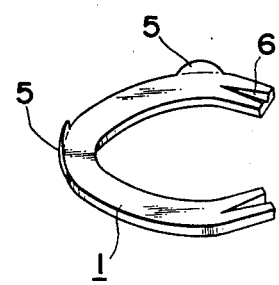
FIG. 2 is a perspective view showing the opposite surface of the horseshoe as shown in FIG. 1.

FIG. 2 is a perspective view showing generally the horseshoes of this invention as seen from the opposite surface or the surface to adhered against the bottom of horse's hoof.

As is apparent from FIG. 2, there are preferably provided a plurality of projections 5 extending from the surface of the complete horseshoe 1 to be adhered against the bottom of the hoof or opposite to the tread surface thereof. These projections 5 are provided for the purpose of positioning the complete horseshoe 1 in due position with respect to the bottom surface of the horse's hoof and to keep it from deviating from the engagement therewith, during use. Such projections may be made integrally with the complete horseshoe 1 or may be made separately of a metal or other suitable materials so as to be set together for use.

Also there may be provided a V-shaped groove 6 on the end tips of each wing of the complete horseshoe 1, the groove being formed in a wedge-like or tapered shape, (i.e. initiating with a deepest depth at the very end of the tips of each of the horseshoe wings and becoming gradually shallower as best seen in FIG. 2). Such grooves are used so that a hand tool such as pliers or the like can conveniently be inserted into the triangular openings defined between the horseshoe end and the bottom surface of the hoof and then wrenched or wedged manually to force the complete horseshoe 1 to be removed from the bottom of the hoof.

Figure 3A:
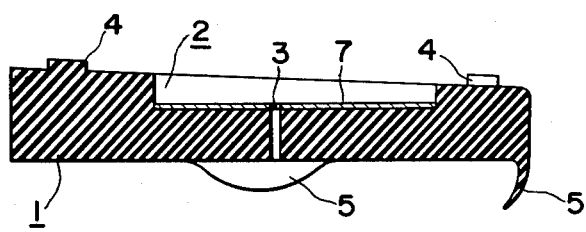
FIG. 3a is a cross-sectional view showing the contour of an elongated recess formed in the horseshoe by way of the embodiment of this invention as shown in FIG. 1.
Figure 3B:
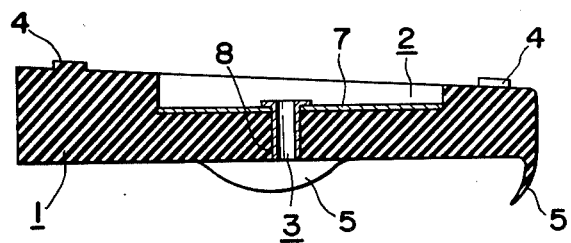
FIG. 3b is a similar cross-sectional view of FIG. 3a showing another embodiment of this invention.

Shown in FIG. 3 are cross-sectional views showing alternative embodiments of the present invention. First shown is a metal plate or sheet 7 to be placed against the bottom of the elongated recesses 2 and 2' for accommodating the nail or nails for securing purposes. This metal plate 7 is provided specifically to further assure that the nail or nails are held securely. Alternatively, a metal tube 8 can be inserted through each of the nail openings 3 formed through the complete horseshoe 1 in order to prevent the complete horseshoe 1 from playing or moving even if the horse has the horseshoes fixed on its hoofs immediately after the horseshoes are mounted and adhered thereupon.

As for the extent of elasticity and/or hardness desired of the elastomeric material to be used with this invention, it is preferred to apply the material having an extent of elasticity or hardness in terms of JIS A 45 ot 98. The material having a hardness of JIS A less than 45 would be too soft in elasticity and/or hardness and would thus make it rather difficult to step hard in galloping, while with a hardness greater than JIS A 98, it would be too hard and it would not matter that the elastomeric material is used. Particularly, the extent of elasticity is preferable on the order of JIS A 60 to 97.

The process to measure the hardness of the elastomeric material to be used in the complete horseshoe of the present invention according to the JIS A Hardness Measurement is as follows: A test piece or sample of elastomeric material is prepared having an opening therethrough. The thus prepared sample is mounted on the test machine, said test machine having a compression surface which has a load of 1000 gf (9.81 N) by way of a spring and a push-rod disposed at the center of the compression surface, with its open end inserted onto the push rod, and then transferring the load of the 1000 gf (9.81 N) to the sample from the compression surface. The amount of distance of the push-rod being pushed back by the elasticity rendered by the sample while under pressure was observed so as to calibrate it. The thus-attained calibration is equally divided from 0 to 100. The calibration is 100 when the pushed back distance is 0 and the calibration is 0 when the total extension of the push-rod is pushed back.

It is preferable to choose the extent of elasticity or hardness of the elastomeric materials for use in the complete horseshoe according to the present invention with consideration to the type of function or duty required of the horse to wear them. For instance, a race horse is required to gallop or canter on the dirt, a lawn or the like which is relatively soft in nature. It is then preferable to use an elastomeric material having a greater hardness, (i.e. of such an order equivalent to the hardness of the hoofs themselves, approx. JIS A 95), particularly on the elasticity of JIS A 85 to 97. In other instances, such as running on a relatively hard ground such as a paved road, etc., it is preferable to use an elastomeric material in the horseshoes having an elasticity or hardness on the order of JIS A 60 to 70.

Figure 4:
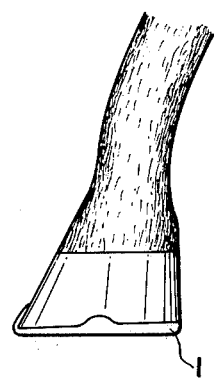
FIG. 4 is a side view as seen when the horseshoes according to this invention are fixed upon the hoof bottom of a horse.

A general state of configuration of the complete horseshoe 1 according to this invention when fixed on the bottom of a hoof of a horse is shown in FIG. 4.

When mounting the horseshoes of the present invention on the bottom of a horse's hoof, an appropriate adhesive or bond is first applied on the bottom surface of the hoof. Next, the horseshoes applied with the adhesive are placed against the bottom of the hoof surface and then to secure the position, nails are driven into the elongated recesses of horseshoe 2 and 2'. When the adhesive sets completely the nails may or may not be removed.

Because of the advantageous and unique nail-free installation of the horseshoes using an adhesive or bond, the horse may rest on the horseshoes immediately after they are attached. Since the nails may be used for the purpose of temporarily securing the position of the horseshoes (i.e. until the adhesive has set), only about one to four nails are required. Also it isn't necessary to drive the nails above the side surface of the horse's hoof and/or to bend the end tips which would have been exposed and bent back, as with a conventional metal horseshoe. Moreover, because of the elongated recesses which are formed in the bottom of the horseshoes of the present invention, if the nails are left unremoved from the horse's hoof, there is no possibility that the nails would level out with the bottom surfaces of the horseshoes and so touch the ground during use.

Also, if metal plates or sheets are placed against the bottom of the elongated recesses, the nails that have been driven therethrough are now further assured of correct positioning. The metal plates or sheets also help to support the horseshoes and minimize their deformation due to their elasticity and the effect of the weight of the horse if the horse steps down on the horseshoes before they are completely secured by the adhesive. Another advantageous effect of the metal plates or sheets is that they minimize the deformation of the horseshoes when the horse gallops in a race, (this is particularly effective for horseshoes having a hardness of JIS A 85 or less), thus helping to create a comfortable and smooth motion for the horse's legs.

In addition, by virtue of the projections provided on the horseshoes according to the present invention, it is further possible to create positive positioning of the horseshoes on the bottom of the horse's hoof which helps prevent the horseshoes from deviating from their proper position when they are initially attached thereto.

When detaching the horseshoes from the bottom of the hoof surface, the horseshoes according to this invention may be removed with substantial ease because of the grooves in the ends of the horseshoes. These grooves enable such hand tools as pliers and the like to be wedged manually between the horseshoe and the bottom surface of the horse's hoof. Also, it is advantageous to provide a plurality of projections of any desired number extending above the tread surface of the complete horseshoe, as these projections serve to create a further positive adhesion to the ground during use.

It should be apparent to one skilled in the art that the above-described embodiments are merely illustrative of but a few of the many possible specific embodiments that can be derived from the present invention without departing from the spirit and scope of the present invention.

I claim:
1. An elastomeric horseshoe comprising:
an elastomeric body portion having a lower surface adapted to face the ground and an upper surface adapted to be fixed in use against the bottom surface of a hoof of a horse;
an elongated recessed area defined by said elastomeric body portion and extending upwardly from said lower surface into the interior of said body portion, said recessed area being of a width and height appropriate to receive the head of at least one relatively short and thin errection nail;
a nail bore area extending from said recessed area to said elastomeric body portion upper surface; and
non-elastomeric reinforcing means disposed at the bottom of said recessed area for securely holding in place a nail extending from said recessed area through said nail bore area and into said hoof.
2. An elastomeric horseshoe as defined in claim 1, wherein an elastomeric material used has a hardness of JIS A 45 to 98.
3. An elastomeric horseshoe as defined in claim 2, wherein an elastomeric material used has a hardness of JIS A 60 to 97.
4. An elastomeric horseshoe as defined in claim 2, wherein an elastomeric material used has a hardness of JIS A 85 to 97.
5. An elastomeric horseshoe as defined in claim 2, wherein an elastomeric material used has a hardness of JIS A 60 to 70.
6. The horseshoe of claim 1 wherein said non-elastomeric reinforcing means comprises a metal plate located against the bottom of said recessed area.
7. The horseshoe of claim 6 wherein said elastomeric body portion has a hardness of JIS A 85 or less.
8. The horseshoe of claim 1 wherein said elastomeric reinforcing means comprises a metal tube inserted through a nail bore opening extending from said recessed area through said bore area to said elastomeric body upper surface.
9. The horseshoe of claim 1 wherein said reinforcing means comprises a metal plate located against the bottom of said recessed area and a metal tube extending from a nail opening provided in said metal plate through said nail bore area to said elastomeric body portion upper surface.

10. The horseshoe of claim 1, wherein said elastomeric body comprises a synthetic rubber material selected from the group consisting of urethane series rubber, and polyvinyl series rubber.

11. The horseshoe of claim 10, wherein said elastomeric body comprises a synthetic rubber material selected from the group consisting of polyurethane, polybutadiene rubber and polystyrene rubber.

12. An elastomeric horseshoe comprising:

an elastomeric body portion having a lower surface adapted to face the ground and an upper surface adapted to be fixed in use against the bottom surface of a hoof of a horse, said body portion further having a mid portion separating a first wing portion from a second wing portion, the end of said first wing portion remote from said mid portion terminating in a first tip portion and the end of said second wing portion remote from said mid portion terminating in a second tip portion;

a first V-shaped groove defined in said upper surface at said first wing portion and extending from the vicinity of said first tip portion toward said mid portion, said groove being formed in the shape of a tapered wedge having its deepest depth at said first tip portion and becoming gradually shallower as it proceeds away from said first tip portion; and a second V-shaped groove defined in said upper surface at said second wing portion and extending from the vicinity of said second tip portion toward said mid portion, said second groove being formed in the shape of a second tapered wedge having its deepest depth at said second tip portion and becoming gradually shallower as it proceeds away from said second tip portion, whereby a hand tool may be inserted into the triangular openings defined by said first and second V-shaped grooves and said hoof bottom surface to facilitate removal of said horseshoe from said hoof.

13. The elastomeric horseshoe of claim 12 further comprising:

a first elongated recessed area defined in said lower surface in the vicinity of said first wing portion, said first recessed area extending longitudinally along said first wing portion from a first point adjacent to said first tip portion to a second point adjacent to said mid portion; and a second elongated recessed area defined in said lower surface in the vicinity of said second wing portion, said second recessed area extending longitudinally along said second wing portion from a third point adjacent to said second tip portion to a fourth point adjacent to said mid portion, said first and second recessed areas such being of a length, width and depth adequate to receive the heads of two spaced apart relatively short and thin horseshoe nails; and a plurality of upstanding projections extending upwardly from said upper surface at the outer perimeter of said horseshoe body portion, said projections being adapted to rest against the front and sides of the horse's hoof and thereby to facilitate the proper positioning of the horseshoe with respect to said hoof.

* * * * *